United States Patent
Haase

(10) Patent No.: US 11,387,468 B2
(45) Date of Patent: Jul. 12, 2022

(54) SEPARATOR PLATE HAVING SPACER ELEMENT AND FUEL CELL SYSTEM

(71) Applicant: Bayerische Motoren Werke Aktiengesellschaft, Munich (DE)

(72) Inventor: Stefan Haase, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 306 days.

(21) Appl. No.: 16/515,540

(22) Filed: Jul. 18, 2019

(65) Prior Publication Data

US 2019/0341631 A1 Nov. 7, 2019

Related U.S. Application Data

(63) Continuation of application No. PCT/EP2018/050688, filed on Jan. 11, 2018.

(30) Foreign Application Priority Data

Feb. 8, 2017 (DE) ...................... 10 2017 201 989.1

(51) Int. Cl.
*H01M 8/0247* (2016.01)
*H01M 8/0276* (2016.01)
*H01M 8/0297* (2016.01)

(52) U.S. Cl.
CPC ....... *H01M 8/0247* (2013.01); *H01M 8/0276* (2013.01); *H01M 8/0297* (2013.01)

(58) Field of Classification Search
None
See application file for complete search history.

(56) References Cited

U.S. PATENT DOCUMENTS

2002/0102453 A1 8/2002 Suenaga et al.
2007/0275288 A1* 11/2007 Goebel .................. H01M 8/242
429/434
(Continued)

FOREIGN PATENT DOCUMENTS

CN 101752587 A 6/2010
DE 102 03 174 A1 9/2002
(Continued)

OTHER PUBLICATIONS

International Search Report (PCT/ISA/210) issued in PCT Application No. PCT/EP2018/050688 dated May 7, 2018 with English translation (six (6) pages).
(Continued)

*Primary Examiner* — Haroon S. Sheikh
(74) *Attorney, Agent, or Firm* — Crowell & Moring LLP

(57) ABSTRACT

A separator plate for at least one fuel cell of a fuel cell system is provided. The separator plate includes at least one seal, wherein the seal is designed to seal at least one media-conducting inner region from a non-media-conducting outer region. The separator plate additionally includes at least one spacer element, which is preferably arranged in the outer region. The separator plate can be contacted by an evaluating device in a contacting region, this region being located such that it lies, in part, between the seal and spacer element. According, a deformation of the separator plate in the contacting region within a fuel cell stack is thus prevented.

19 Claims, 3 Drawing Sheets

(56) References Cited

U.S. PATENT DOCUMENTS

| | | | |
|---|---|---|---|
| 2008/0118803 A1* | 5/2008 | Dekker | H01M 8/0271 429/495 |
| 2008/0261104 A1* | 10/2008 | Goto | H01M 8/0271 429/483 |
| 2009/0004522 A1* | 1/2009 | Rock | H01M 8/2457 429/508 |
| 2009/0253022 A1* | 10/2009 | Rock | H01M 8/242 429/434 |
| 2010/0047650 A1 | 2/2010 | Iino et al. | |
| 2010/0178590 A1* | 7/2010 | Shirakawa | H01M 8/242 429/507 |
| 2010/0221637 A1 | 9/2010 | Nakagawa et al. | |
| 2012/0107718 A1* | 5/2012 | Masaka | H01M 8/0247 429/482 |
| 2012/0270136 A1 | 10/2012 | Mizusaki et al. | |
| 2013/0029195 A1* | 1/2013 | Peace | H01M 8/188 429/70 |
| 2013/0157097 A1* | 6/2013 | Kampanatsanyakorn | H01M 8/247 429/105 |
| 2017/0155161 A1 | 6/2017 | Poirot-Crouvezier et al. | |
| 2017/0222247 A1* | 8/2017 | Sakano | H01M 8/0206 |
| 2018/0159147 A1* | 6/2018 | Oku | H01M 8/0267 |
| 2019/0173102 A1* | 6/2019 | Ichihara | H01M 8/242 |

FOREIGN PATENT DOCUMENTS

| | | |
|---|---|---|
| DE | 10 2009 039 901 A1 | 3/2011 |
| DE | 10 2009 039 903 A1 | 3/2011 |
| JP | 2002-313399 A | 10/2002 |
| JP | 2008-140722 A | 6/2008 |

OTHER PUBLICATIONS

German-language Written Opinion (PCT/ISA/237) issued in PCT Application No. PCT/EP2018/050688 dated May 7, 2018 (six (6) pages).

German-language Search Report issued in counterpart German Application No. 102017201989.1 dated Oct. 27, 2017 with partial English translation (13 pages).

Chinese-language Office Action issued in Chinese Application No. 201880009081.8 dated Oct. 29, 2021 with English translation (15 pages).

* cited by examiner

SEPARATOR PLATE HAVING SPACER ELEMENT AND FUEL CELL SYSTEM

CROSS REFERENCE TO RELATED APPLICATIONS

This application is a continuation of PCT International Application No. PCT/EP2018/050688, filed Jan. 11, 2018, which claims priority under 35 U.S.C. § 119 from German Patent Application No. 10 2017 201 989.1, filed Feb. 8, 2017, the entire disclosures of which are herein expressly incorporated by reference.

BACKGROUND AND SUMMARY OF THE INVENTION

The invention disclosed here relates to a separator plate for at least one fuel cell of a fuel cell system. Moreover, the invention disclosed here relates to a fuel cell system having at least one such separator plate.

Fuel cell systems are known in themselves. They generally include several hundred separator plates, being connected in each case by a contact region to a cell monitoring unit. In known solutions, the danger exists that when stacking the fuel cells the contact regions of the separator plates will get bent in an undesirable manner. This could result in the separator plates possibly not being contacted or not fully contacted.

An object of the invention disclosed herein is to lessen or eliminate at least one drawback of a previously known solution or to propose an alternative solution. In particular, one preferred object of the invention disclosed here is to improve the electrical contact between a separator plate and an evaluation device, preferably with relatively little expense and/or preferably with relatively little influence on the size and/or on the production costs of the fuel cell system. Further preferred objects may emerge from the advantageous effects of the invention disclosed herein.

The invention disclosed here relates to a fuel cell system having at least one fuel cell. The fuel cell system is intended for example for mobile applications such as motor vehicles, especially for the provision of energy for at least one driving machine for the propulsion of the motor vehicle. In its most simple form, a fuel cell is an electrochemical energy transducer, which transforms fuel and oxidizing agent into reaction products, thereby producing electricity and heat. The fuel cell includes an anode and a cathode, which are separated by an ion-selective or ion-permeable separator. The anode is supplied with fuel. Preferred fuels are hydrogen, low-molecular alcohol, biofuels, or liquefied natural gas. The cathode is supplied with oxidizing agent. Preferred oxidizing agents are air, oxygen and peroxides, for example. The ion-selective separator may be designed for example as a proton exchange membrane (PEM). Preferably, a cation-selective polymer electrolyte membrane is used. Materials for such a membrane are for example Nafion®, Flemion®, and Aciplex®.

A fuel cell system comprises, besides the at least one fuel cell, peripheral system components (BOP components), which may be used during the operation of the at least one fuel cell. Generally multiple fuel cells are combined into a fuel cell stack.

The fuel cells of the fuel cell system generally include two separator plates. The ion-selective separator of a fuel cell is generally situated between every two separator plates. The one separator plate forms together with the ion-selective separator the anode. The other separator plate situated at the opposite side of the ion-selective separator therefore forms together with the ion-selective separator the cathode. Gas ducts for fuel and for oxidizing agent are preferably provided in the separator plates.

The separator plates may be designed as monopolar plates and/or as bipolar plates. In other words, a separator plate expediently has two sides, one side forming together with an ion-selective separator an anode and the second side together with a further ion-selective separator of a neighboring fuel cell forming a cathode.

Generally so-called gas diffusion layers (GDL) are further provided between the ion-selective separators and the separator plates.

A fuel cell stack comprises such separator plates and membrane-electrode assemblies (MEAs). The separator plates are usually made of metal or graphite. In the case of metallic bipolar plates, these generally comprise at least two individual plates, which are shaped and then placed, bonded, and/or welded one on the other. The seal or sealing geometry (hereinafter, simply "seal") seals off the fluid layers from each other and from the outside. Furthermore, the seal produces an appropriate distance between the separator plates. This distance is not represented in the side regions or outer regions or other non-supported regions which are not supported by this layer.

These side regions, in which the evaluation devices are hooked up, have a tendency to bend and do not maintain their shape due to the pressure of the stack. In this way, the stacking may be difficult and it may be impossible or at least difficult to attach the plug of the evaluation device on account of the deformation of the separator plate in the attachment region, unless the plug is designed to withstand large tolerances.

The fuel cell system may include an evaluation device. Preferably, the evaluation device is designed as a cell monitoring system. The cell voltage monitoring system (CVM system) may be designed to monitor the condition of at least one cell. In general, it monitors the condition of a plurality of fuel cells. Monitoring means in this context that the system can directly or indirectly determine the condition of the monitored cells. Advantageously, therefore, a degradation occurring or the failure of a cell can be recognized early on and appropriate countermeasures can be taken. In this way, the service life may be increased to a certain degree and/or the performance of the totality of cells can be boosted by suitable countermeasures.

Advantageously, at least one measured quantity can be detected directly or indirectly. The measured quantity may be in particular the electrical voltage of the monitored cell. Advantageously, the individual cell voltages of many or all of the cells and the overall voltage are determined. Preferably, moreover, the current flowing through the fuel cell stack is determined. From the measured voltages, the CVM system can determine for example one of the following values: min., max., and mean value of the individual cell voltage. Advantageously, therefore, voltage deviations between the individual cells or from a mean value of the individual cell voltages can be recognized. Preferably, further individual cell analysis methods are carried out, such as for example an impedance calculation (e.g., electrochemical impedance spectroscopy).

The evaluation device can expediently be electrically connected in each case to at least one, preferably to a plurality or all of the separator plates. For this, the separator plate may have at least one electrical contacting region for the direct or indirect connection of the evaluation device. The contacting region may extend from the edge R of the separator plate toward the interior of the separator plate. In another embodiment, the contacting region may protrude at least partly from the edge R to the outside. The contacting region may be formed for example on one side or on both sides of the separator plate.

The contacting region may be for example at least one free surface on the separator plate. An element of a connecting plug of the evaluation device may contact the separator plate directly. For this, for example, a terminal of the connecting plug may directly clamp a free surface. Alternatively or additionally, further measures may be provided in the contacting region. For example, at least one contact pin may be provided in the contacting region, while the contact pin is designed to enter into an electrical connection directly or indirectly with the evaluation device. Thus, the releasable electrical connection between the evaluation device and the separator plate also need not be produced in the contacting region. Instead, the contacting region is the region across which the electric current flows to the evaluation device or the electric voltage is picked off for the evaluation device.

Advantageously, the connecting plug is designed to individually contact a plurality of separator plates. For this, the connecting plug may have a plurality of electrical connection points, each of them contacting the contact region or regions of the separator plates.

The invention disclosed here furthermore includes at least one seal. The seal may be a separately applied seal or a sealing contour integrated in the separator plate or formed by the separator plate. In the invention disclosed here, the term "seal" is intended to encompass each time the separately applied seal and also the sealing contour integrated in the separator plate or formed by the separator plate. The seal is designed to seal off at least one media-conducting inner region of the separator plate in the installed condition of the separator plate or of the fuel cell stack from a non-media-conducting outer region of the separator plate.

The media-conducting inner region may also be referred to as "a region of the separator plate forming a media supply for the fuel cell" or "a region of the separator plate through which media flows in the installed condition of the separator plate or of the fuel cell stack". Hereinafter, for simplicity, the term "inner region" will be used. The media are in particular the oxidizing agent taking part in the electrochemical reaction and the fuel or the coolant of the fuel cell or of the fuel cell system.

The non-media-conducting outer region of the separator plate is in particular the region which in the installed condition of the separator plate or of the fuel cell stack does not come into contact with at least one of the media taking part in the electrochemical reaction or with the coolant. The outer region is in particular the region which is formed between the seal and the edge R of the separator plate.

Preferably, the seal encloses at least the active surfaces of the fuel cell as well as the media ports of the fuel cell. In particular, the seal may also be referred to as an outer seal.

Each of the media ports and/or each of the media ducts to the active surfaces or in their distributor structures may in each case include at least one further seal, which are likewise expediently enclosed by an outer seal.

Preferably, the seal is frame-shaped and seals off the flowed-through inner region with respect to the edge R of the separator plate. In other words, it is preferably a seal with no beginning or end, forming in particular a closed frame contour.

The separator plate disclosed here further includes at least one spacer element. The spacer element is preferably situated in the outer region. The contacting region is situated in the same outer region as the spacer element. The spacer element may however also be provided in another outer region, for example, in a predistributor structure. The spacer element is designed to space apart and to position the separator plate at least in regions from an immediately adjacent component, especially also in the installed condition of the separator plate or of the fuel cell stack.

Preferably, at least one spacer element can be provided on a front side of the separator plate. Moreover, at least one spacer element may be provided on a rear side of the same separator plate. Two such spacer elements (hereinafter also referred to as the first and second spacer element) form a spacer element pair. Especially preferably, the spacer elements of the spacer element pair are situated on the front side and the rear side at corresponding locations of the front side and the rear side. In particular, the spacer elements of the spacer element pair can lie against each other in their transition region to the surface. Advantageously, the spacer elements of the spacer element pair are situated coaxially in the stacking direction or in the direction of the longitudinal axis of the fuel cell stack in the installed condition. In the installed condition, the forces and torques are then transmitted advantageously from the first spacer element to the corresponding other or second spacer element on the other side. Moreover, these spacer elements are preferably designed such that these corresponding spacer elements can be compressed in the installed condition. By virtue of such a configuration, the contact region can be positioned especially well. In particular, the spacer elements of the spacer element pair can be arranged flush with each other in the stacking direction of the fuel cell stack (i.e., perpendicular to the surface of the front side or rear side) in a top view looking at the separator plate. In particular, the spacer elements of the spacer element pair can be designed to be braced against each other in the installed condition. The spacer elements of the spacer element pair are expediently spaced at an equal distance from the edges of the separator plate.

The spacer element, especially the first and/or second spacer element, may be configured such that the spacer element has the same or substantially the same flexibility, at least in a region, especially in a bearing region, as the regions of the seal and/or of the second spacer element of the spacer element pair situated adjacent and preferably immediately adjacent to the spacer element or the first spacer element. The term "substantially the same flexibility" means here that the seal has substantially the same elastic or plastic behavior when stacking the fuel cell stack as the spacer element or the first and/or second spacer element. Hence, the regions of the seal in closest proximity to the (first and/or second) spacer element have the same mechanical behavior as the (first and/or second) spacer element. Advantageously, it may thus be ensured that when stacking the components of the fuel cell stack the contacting region is held in a defined position with respect to its distance from the immediately adjacent components by the (first and/or second) spacer element, so that the plug can better contact the separator plate. In this way, the danger of an inadequate contacting of the separator plate can be at least reduced.

Advantageously, the spacer element, especially the first and/or second spacer element, may be designed such that the spacer element, at least in a region, especially in the bearing region, projects or is raised for substantially the same distance from the surface or the surface plane O of the separator plate as the regions of the seal situated adjacent or immediately adjacent to the (first and/or second) spacer element.

The bearing region of the spacer element is the region of the (first and/or second) spacer element on which the immediately adjacent component in the fuel cell stack rests in the installed condition (i.e., after the stacking of the fuel cell stack). In particular, the same component of the fuel cell stack lies in the installed condition in both the bearing region of the spacer element and in the adjacent or immediately adjacent region of the seal. Advantageously, therefore, the (first and/or second) spacer element and the seal are substantially equally compressed.

The spacer element, especially the first and/or second spacer element, may also have at least one non-bearing region, which projects from or is raised above the surface O of the separator plate. However, the non-bearing region does not project so far as to make contact with the immediately adjacent component in the installed condition.

According to the invention disclosed here, the bearing region may pass in the longitudinal direction continuously or smoothly into the non-bearing region. In other words, the bearing region may thus run into a non-bearing region. Hence, there are expediently no abrupt transitions present in the longitudinal direction X. In particular, the transitional radii between the bearing region and the non-bearing region may be larger by a multiple (e.g., at least by a factor of 10, 50, 100 or 1000) than the transitional radii to the side flanks as disclosed here.

According to the invention disclosed here, the spacer element, especially the first and/or second spacer element, may have at least two longitudinal ends. Moreover, the spacer element may have at least two side flanks. The side flanks expediently extend substantially in the longitudinal direction X of the spacer element. The side flanks connect the bearing region of the spacer element to the surface O of the separator plate. The side flanks are preferably arranged so as to be steeper than the flanks of the longitudinal ends, preferably by a multiple (e.g., at least by a factor of 2, 5 or 10 or 30). The transition from the bearing region of the spacer element to the longitudinal ends or to the non-bearing region may be carried out in a less abrupt manner than the transition to the side flanks.

Preferably, the spacer element, especially the first and/or second spacer element, is oblong in shape. Oblong means in this context that the spacer element may have a length to width ratio of at least 2 or 3 or 5 or 10.

Advantageously, the spacer element, especially the first and/or second spacer element, has a width transversely to the longitudinal direction of 0.5 to 2 D, preferably 0.8 to 1.2 D, where D is the width of the bearing surface of the seal in the region situated immediately adjacent or adjacent to the spacer element.

The spacer element, especially the first and/or second spacer element, may have a cross section contour, at least in a region, especially in the bearing region, in a cross section perpendicular to the longitudinal axis of the spacer element extending in the longitudinal direction X, which corresponds substantially to the cross section contour of the region of the seal situated adjacent to the spacer element. Such a substantially equal cross section contour may contribute to the spacer element and the sealing element having substantially the same flexibility.

Especially preferably, the contacting region is situated at least in a region, between the spacer element, especially the first and/or second spacer element, and the seal. Especially preferably, the contacting region is flat in configuration.

Further preferably, three sides of the contacting region stiffen, space apart, and/or position the seal and the spacer element, at least in a region. Advantageously, the fourth side may be formed by the outer edge R of the separator plate.

The seal and the spacer element, especially the first and/or second spacer element, can be formed from the same material, at least in a region. In particular, the adjacent or immediately adjacent region of the seal and the spacer element can be produced from the same material at least in the regions raised or projecting in relation to the surface O of the separator plate or standing out from the surface O. The material may preferably be a metal material. For example, a pure metal or a metal alloy may be used as the metal material. Preferably, steel or titanium is used as the metal material.

The seal and/or the at least one spacer element, especially the first and/or second spacer element, can be produced by a forming process, such as embossing, pressing, hydroforming. Preferably, the seal and/or the at least one (first and/or second) spacer element is/are formed at the same time as the separator plate.

Preferably, the spacer element, especially the first and/or second spacer element, is situated immediately adjacent to the contacting region. Further preferably, the spacer element is situated immediately adjacent to a positioning recess. The positioning recess serves for positioning the individual separator plates of the fuel cell stack during the stacking process.

According to one advantageous embodiment, a further sealing layer such as a non-porous foam can be provided on the bearing surface of the seal and on the bearing surface of the spacer element.

Thus, the invention disclosed here relates to a separator plate for at least one fuel cell of a fuel cell system. Moreover, the separator plate comprises at least one seal, wherein the seal is designed to seal off at least one media-conducting inner region from a non-media-conducting outer region. Furthermore, the separator plate comprises at least one spacer element, which can be situated in the inner region or preferably the outer region.

In other words, the invention disclosed here relates to a separator plate or bipolar plates in which the lateral structure is braced by an additional contour (also called a spacer element here) having very similar compression properties to the sealing contour. This additional contour has similar properties in the longitudinal direction to a sealing contour and may also include elements of the sealing contour in the middle. At both ends, the height of the additional contour or "sealing line" slowly decreases, so that hardly any additional stiffening (greater than the sealing contour) results. Such would be the case with a flat contour, for example, characterized by round ends.

Thus, advantageously, regions are braced in which no active surface or no sealing surface is situated (also referred to as the outer region here). These may be lateral regions, but also regions in the predistributor structure, for example. Thus, advantageously, the plug of an evaluation device can be mounted more easily. Further advantageously, plugs with a smaller tolerance range can be provided.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
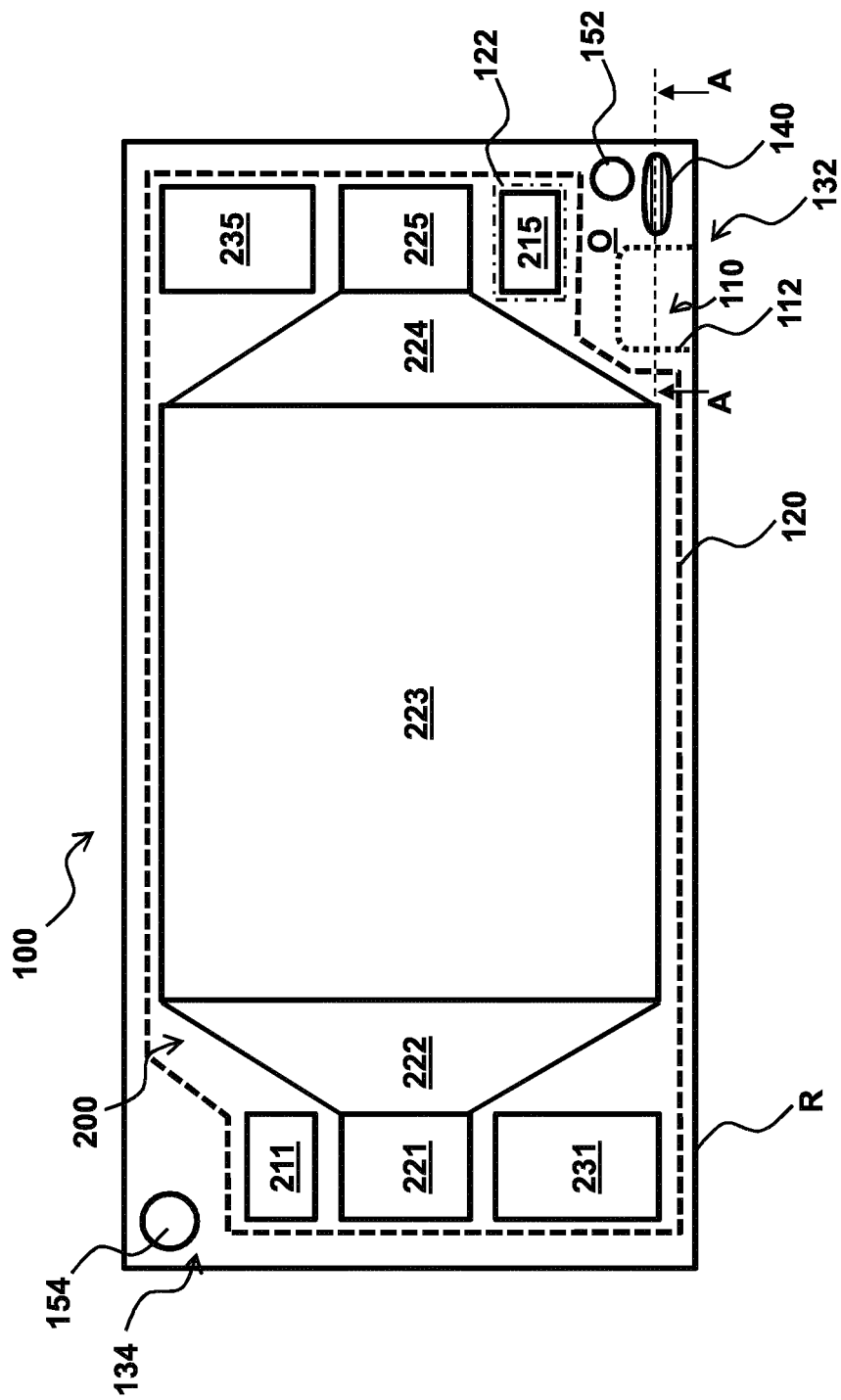
FIG. 1 is a schematic top view of the separator plate disclosed here.

FIG. 1 shows a separator plate 100 in top view. In a fuel cell stack, normally several hundred separator plates 100 are stacked to form a fuel cell stack. The individual separator plates 100 are compressed in this process in order to achieve the required tightness of the individual cells or of the fuel cell stack.

The separator plate 100 includes multiple media supply lines 211, 221, 231 through which media (usually fuel, oxidizing agent and cooling liquid) flow. In FIG. 1, moreover, a predistributor 222 is shown, which distributes the medium over the individual ducts of the flow field 223. By the media drain 224, the medium after the electrochemical reaction is taken away to the media outlet 225 once more. Furthermore, two additional media ports 215, 235 can be seen here. The aforementioned media-conducting regions together form the media-conducting inner region 200, which is or can be sealed off by the seal or outer seal 120 from the non-media-conducting outer regions 132, 134. The outer regions 132, 134 here are situated between the seal 120 and the outer edge R of the separator plate 100. In the outer region 132 there is provided the contacting region 110 for the connection of a plug of an evaluation device. For example, the terminal of a contact plug can be mounted at this region. The front region of the contacting region 110 terminates flush here with the edge R of the separator plate 100. The spacer element 140 is situated here directly adjacent to the contacting region 110 and to the positioning recess 152. Moreover, the contacting region 110 (shown here by a dashed line) is situated at least in a region between the spacer element 140 and the seal 120. In this way, the spacer element 140 and the seal 120 position the contacting region 110 such that the manufacturing tolerance is relatively slight. A stiffening rib or fold 112 can further be provided here around the contacting region 110, for example along the dashed line. However, this stiffening 112 has a significantly smaller spacing from the separator plate surface O than the seal 120 or the spacer element 140, so that the stiffening has no effect on the positioning of the contacting region 110. The front side of the separator plate 100 is shown here. On the rear side (not shown) of this separator plate 100 there may be arranged a further spacer element 140 in a corresponding location of the separator plate 100, i.e., likewise immediately adjacent to the contacting region 110 and immediately adjacent to the positioning recess 152.

Figure 2:
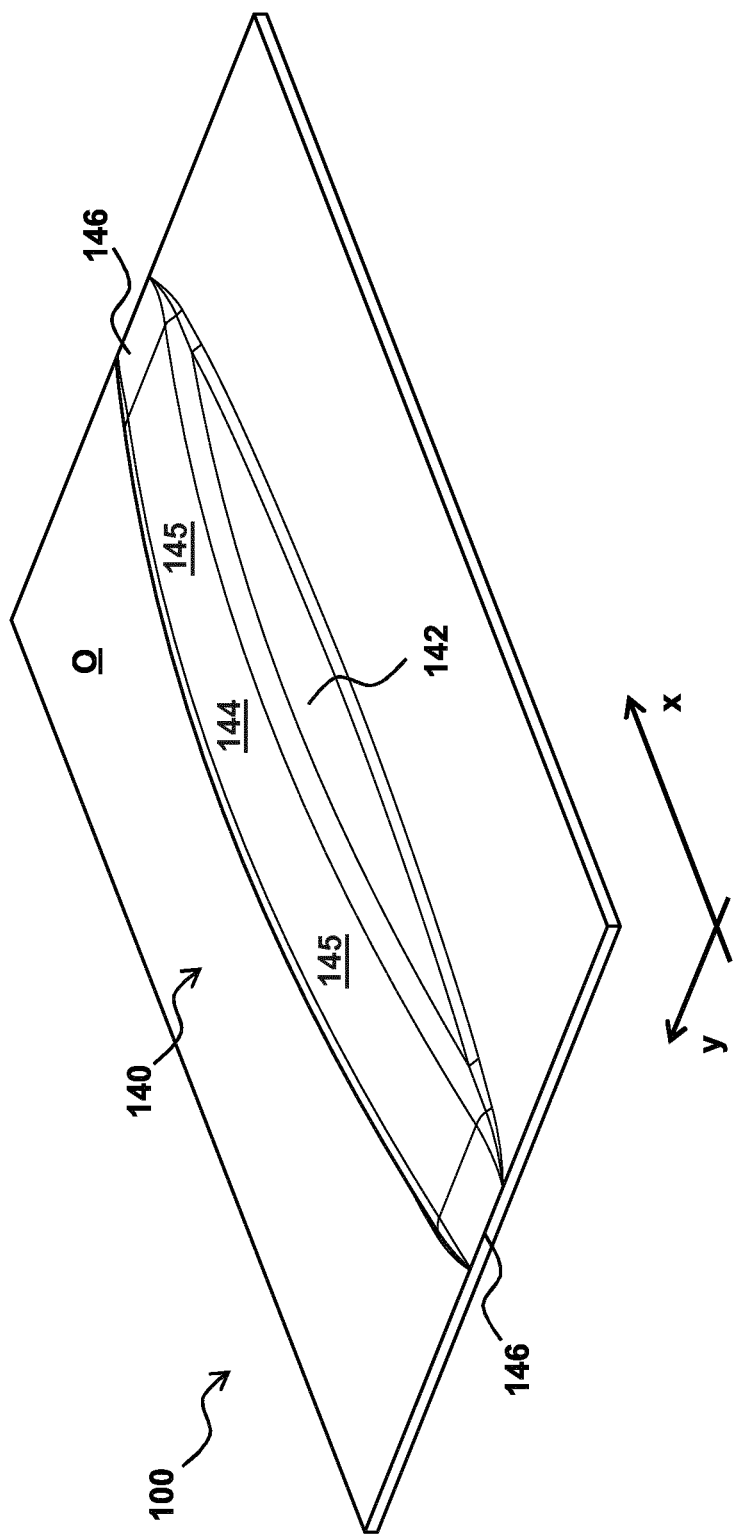
FIG. 2 is a perspective detail view of a spacer element.

FIG. 2 shows a perspective detail view of the spacer element 140, such as may be formed for example in the separator plate according to FIG. 1.

The spacer element 140 stands off from the surface O of the separator plate 100. In the bearing region 144, the spacer element 140 in the installed condition lies against an adjacent component. However, in the non-bearing regions 145, which likewise stand off from the surface O of the separator 100, it does not lie against the adjacent component in the installed condition. The transition from the bearing region 144 to the non-bearing region 145 is continuous or smooth here. The spacer element 140 here runs out toward the longitudinal ends 146. However, the transition from the bearing region 144 to the side flanks 142 is abrupt. The transition radius from the bearing region 144 to the non-bearing region 145 is larger by a multiple than the transition radius from the bearing region 144 to the side flanks 142.

With a spacer element 140 configured in such a way it is possible to establish mechanical properties substantially conforming to the mechanical properties of the endless frame seal. Hence, the spacer element 140 and the corresponding regions of the seal 120 have substantially the same flexibility. Advantageously, it is possible to lessen or prevent a deformation of the contacting region 110 during the stacking.

Figure 3:
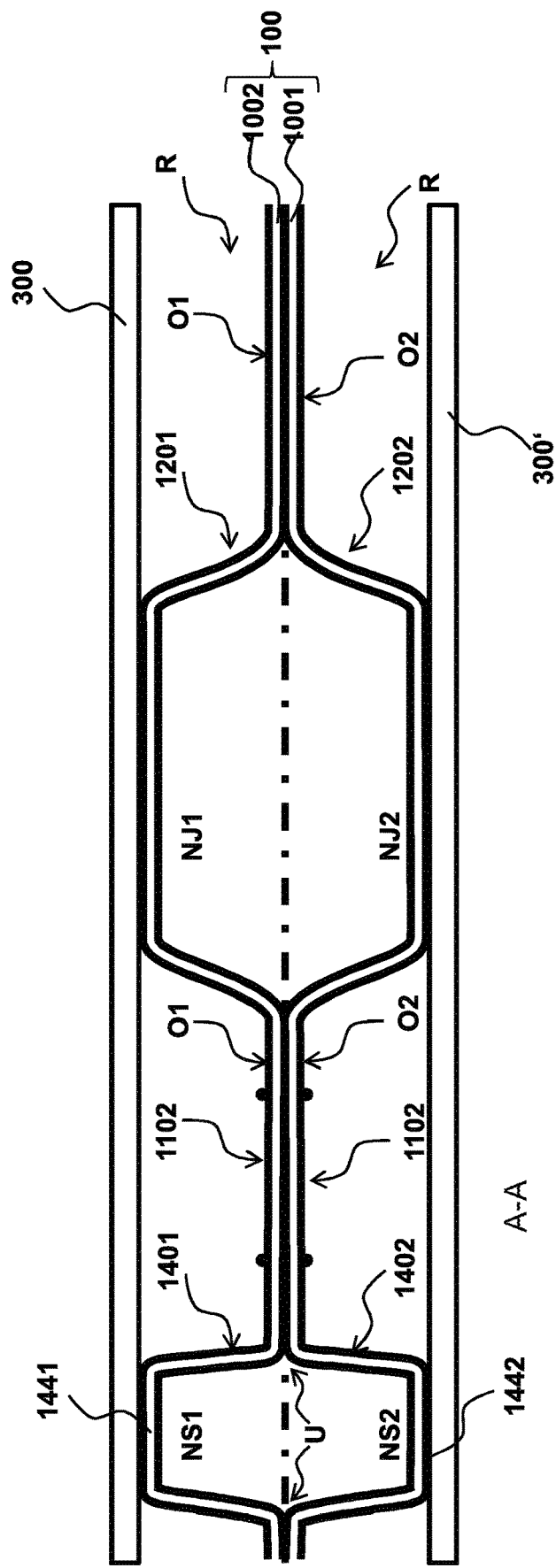
FIG. 3 is a schematic partial sectional view along line A-A in one configuration of the invention disclosed here.

FIG. 3 shows a further embodiment of the invention disclosed here along line A-A of FIG. 1. The separator plate 100 here is formed by two partial plates 1001, 1002. The partial plates may be two metal sheets, for example, in which the media ducts have been provided by a forming process. This need not be the case however. The separator plate 100 here furthermore comprises a first seal 1201 and a second seal 1202, which are situated here at corresponding sealing locations. Moreover, the separator plate 100 here includes a first spacer element 1401 and a second spacer element 1402. The first spacer element 1401 and the second spacer element 1402 here are situated at corresponding locations. The first spacer element 1401 and the second spacer element 1402 form a spacer element pair here. The transition regions U from the first spacer element 1401 and from the second spacer element 1402 to the first surface O1 of the front side V and to the second surface O2 of the rear side R lie against each other here. Likewise, the transition regions of the first seal 1201 and the second seal 1202 lie against each other. Adjacent components 300, 300', here sub-frames, in each case lie against the bearing regions of the spacer elements 1401, 1402 and the seals 1201, 1202. These adjacent components 300, 300' compress the spacer elements 1401, 1402 and the seals 1201, 1202, whereby substantially the same deformation of the spacer elements 1401, 1402 and the seals 1201, 1202 occurs ideally. Preferably, the flexibility of the spacer elements 1401, 1402 and the seals 1201, 1202 is chosen such that the following equation (1) applies:

$$\frac{NJ1}{NJ2} = \frac{NS1}{NS2} = K \qquad (1)$$

where
the first spacer element 1401 has a first flexibility NS1;
the second spacer element 1402 has a second flexibility NS2;
the first seal 1201 has a first seal flexibility NJ1;
the second seal 1202 has a second seal flexibility NJ2; and
K is a constant.

Advantageously, the flexibility of the seals and spacer elements is chosen such that the contacting regions of several separator plates, especially the contacting regions which are contacted by a common connecting plug, are spaced apart from each other by an equal distance.

With flexibility chosen in such a way, it can be achieved that the separator plate 100 undergoes little or no bending due to the compression. If the constant is K=1, on the one hand the first and second spacer element 1401, 1402 are evenly compressed by the same amount and on the other hand the first and second seal 1201, 1202 are evenly compressed by the same amount. As a result, the center line of the adjacent components 300, 300' is at an equal distance. This can be advantageous in particular in the design of the connecting plug. Moreover, the front side V and the rear side R each have an electrical contacting region 1101, 1102 here.

In the context of the technology disclosed here, "immediately adjacent" means that no further element is situated between the immediately adjacently situated elements. In the context of the technology disclosed here, "adjacent" regions are the regions which are situated in closest proximity to each other or at the least distance from each other. In the context of the technology disclosed here, "substantially" encompasses in each case the exact value as well as values which deviate so little from the exact value that the deviation is insignificant in regard to the function intended by the value. For example, the term "substantially" includes unavoidable manufacturing tolerances. In the context of the technology disclosed here, sometimes only one spacer element or one seal is mentioned. This should also encompass both the first spacer element and/or the second spacer element or the first seal and/or the second seal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A separator plate for at least one fuel cell of a fuel cell system, comprising:
    at least one seal, wherein the seal is designed to seal off at least one media-conducting inner region from a non-media-conducting outer region; and
    at least one spacer element which is situated in the outer region, wherein:
    the spacer element has a bearing region, a portion of which projects a first distance from a surface of the separator plate,
    the spacer element has a non-bearing region, a portion of which projects a second distance from the surface of the separator plate,
    the first distance is greater than the second distance,
    the bearing region passes smoothly into the non-bearing region without an abrupt transition in a longitudinal direction,
    the spacer element has at least two longitudinal ends and at least two side flanks, and
    a transition radius from the bearing region to the non-bearing region is larger by a multiple than a transition radius from the bearing region to the side flanks.

2. The separator plate according to claim 1, further comprising:
    at least one contacting region for connection of an evaluation device, wherein the contacting region is situated in the same outer region as the spacer element.

3. The separator plate according to claim 2, wherein the spacer element is situated directly adjacent to the contacting region.

4. The separator plate according to claim 3, wherein the contacting region is situated, at least in a region, between the spacer element and the seal.

5. The separator plate according to claim 4, wherein the seal and the spacer element are designed to space apart and/or to position, at least in a region, three sides of the contacting region.

6. The separator plate according to claim 2, wherein the contacting region is situated, at least in a region, between the spacer element and the seal.

7. The separator plate according to claim 2, wherein the seal and the spacer element are designed to space apart and/or to position, at least in a region, three sides of the contacting region.

8. The separator plate according to claim 2, wherein one side of the contacting region is formed by an outer edge of the separator plate.

9. The separator plate according to claim 2, wherein the contacting region is flat in configuration.

10. The separator plate according to claim 2, wherein the contacting region has a stiffening fold or rib.

11. The separator plate according to claim 1, wherein the spacer element is situated immediately adjacent to a positioning recess.

12. The separator plate according to claim 1, wherein
    the spacer element has a length to width ratio of at least two, and
    the spacer element is not designed as an endless frame seal.

13. The separator plate according to claim 1, wherein
    the side flanks are arranged so as to be steeper than flanks of the longitudinal ends.

14. The separator plate according to claim 1, wherein
    at least one spacer element is provided on a front side of the separator plate and
    at least one spacer element is provided on a rear side of the same separator plate, forming a spacer element pair.

15. The separator plate according to claim 14, wherein the spacer elements of the spacer element pair have substantially the same flexibility.

16. The separator plate according to claim 1, wherein
    the spacer element is configured such that the spacer element has substantially the same flexibility at least in the bearing region of the spacer element as a region of the seal situated adjacent to the spacer element.

17. The separator plate according to claim 1, wherein
    the spacer element is designed such that the spacer element, at least in the bearing region, projects for substantially the same distance from a surface of the separator plate as a region of the seal situated adjacent to the spacer element.

18. The separator plate according to claim 1, wherein
    the spacer element has a cross section contour, at least in the bearing region, which corresponds substantially to a cross section contour of a region of the seal situated adjacent to the spacer element.

19. The separator plate according to claim 1, wherein the seal and the spacer element are formed at least partly from the same material in regions raised in relation to a surface of the separator plate.

* * * * *